US011028714B2

(12) United States Patent
Kling

(10) Patent No.: US 11,028,714 B2
(45) Date of Patent: Jun. 8, 2021

(54) FAN PLATFORM WEDGE SEAL

(71) Applicant: United Technologies Corporation, Farmington, CT (US)

(72) Inventor: Colin J. Kling, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 525 days.

(21) Appl. No.: 16/036,038

(22) Filed: Jul. 16, 2018

(65) Prior Publication Data
US 2020/0018179 A1 Jan. 16, 2020

(51) Int. Cl.
| F01D 11/00 | (2006.01) |
| F01D 5/02 | (2006.01) |
| F01D 5/30 | (2006.01) |
| F04D 29/32 | (2006.01) |
| F02C 7/36 | (2006.01) |

(52) U.S. Cl.
CPC .............. *F01D 11/008* (2013.01); *F01D 5/02* (2013.01); *F01D 5/3007* (2013.01); *F04D 29/322* (2013.01); *F04D 29/329* (2013.01); *F02C 7/36* (2013.01); *F05D 2220/36* (2013.01); *F05D 2240/20* (2013.01); *F05D 2240/80* (2013.01)

(58) Field of Classification Search
CPC .... F01D 11/008; F01D 11/001; F01D 11/005; F01D 11/006; F01D 5/02; F01D 5/30; F01D 5/3007; F01D 5/3015; F04D 29/322; F04D 29/329; F04D 29/083; F05D 2240/80; F02C 7/36
USPC ..... 416/193 A; 277/529, 565–567, 626–627, 277/644–647
See application file for complete search history.

(56) References Cited

U.S. PATENT DOCUMENTS

| 4,183,720 | A | * | 1/1980 | Brantley | ............... | F01D 11/006 |
| | | | | | | 416/193 A |
| 5,277,548 | A | * | 1/1994 | Klein | ................... | F01D 11/008 |
| | | | | | | 29/889.21 |
| 5,464,326 | A | * | 11/1995 | Knott | ................... | F01D 11/008 |
| | | | | | | 416/193 A |
| 5,573,377 | A | * | 11/1996 | Bond | ..................... | F01D 5/147 |
| | | | | | | 416/219 R |

(Continued)

FOREIGN PATENT DOCUMENTS

| FR | 2927357 A1 | 8/2009 |
| JP | 2003-20995 A | 1/2003 |
| WO | 2015/088593 A1 | 6/2015 |

OTHER PUBLICATIONS

European Search Report for EP Application No. 19186635.9 dated Dec. 17, 2019.

*Primary Examiner* — Brian P Wolcott
*Assistant Examiner* — Behnoush Haghighian
(74) *Attorney, Agent, or Firm* — Carlson, Gaskey & Olds, P.C.

(57) ABSTRACT

A fan rotor includes a fan hub and a plurality of fan blades extending radially outwardly from the fan hub. Platforms are positioned intermediate blade sides of adjacent ones of the fan blades. Seals are positioned between the blade sides and platform sides of the platform seals. The seals have an elongated bonding area bonded to one of the platform sides and the fan blade sides. The seal extends radially outwardly from the elongated bonding area to a wedge portion. A gas turbine engine and a seal are also disclosed.

17 Claims, 4 Drawing Sheets

(56) References Cited

U.S. PATENT DOCUMENTS

| | | | | |
|---|---|---|---|---|
| 5,890,874 | A * | 4/1999 | Lambert | F01D 11/008 416/193 A |
| 6,514,045 | B1 * | 2/2003 | Barton | F01D 5/22 416/193 A |
| 6,568,691 | B1 * | 5/2003 | Westhoff | F16L 5/10 277/604 |
| 7,811,053 | B2 * | 10/2010 | Balamucki | F01D 5/10 415/173.1 |
| 7,950,900 | B2 * | 5/2011 | Mulcaire | F01D 11/008 415/191 |
| 8,206,118 | B2 * | 6/2012 | Propheter-Hinckley | F01D 5/3007 416/219 R |
| 8,801,381 | B2 * | 8/2014 | Simon-Delgado | F01D 5/147 416/193 A |
| 8,827,650 | B2 * | 9/2014 | Forgue | F01D 5/3007 416/193 A |
| 8,997,494 | B2 * | 4/2015 | Chuang | F04D 29/384 137/15.1 |
| 9,267,386 | B2 * | 2/2016 | Turner | F01D 11/008 |
| 9,297,268 | B2 * | 3/2016 | Alarcon | F04D 29/321 |
| 9,328,612 | B2 * | 5/2016 | Kubel | F01D 5/005 |
| 9,376,926 | B2 * | 6/2016 | Anderson | F01D 5/3015 |
| 9,587,645 | B2 * | 3/2017 | Guglielmin | F04D 29/325 |
| 9,611,746 | B2 * | 4/2017 | Luczak | F01D 5/26 |
| 9,650,902 | B2 * | 5/2017 | Billings | F01D 5/3007 |
| 9,682,450 | B2 * | 6/2017 | Tomeo | B23P 15/04 |
| 9,869,323 | B2 * | 1/2018 | Ravier | F04D 29/16 |
| 9,988,920 | B2 * | 6/2018 | Tatton | F01D 11/008 |
| 10,024,177 | B2 * | 7/2018 | Brown | F01D 5/3053 |
| 10,047,625 | B2 * | 8/2018 | Tatton | F01D 11/008 |
| 10,072,509 | B2 * | 9/2018 | Hubbert | F01D 5/32 |
| 10,273,816 | B2 * | 4/2019 | Abraham | F01D 5/3092 |
| 10,293,530 | B2 * | 5/2019 | Marchal | B29C 70/48 |
| 10,598,022 | B1 * | 3/2020 | Kannangara | F01D 25/28 |
| 2007/0280830 | A1 * | 12/2007 | Mulcaire | F01D 11/008 416/193 R |
| 2010/0284816 | A1 * | 11/2010 | Propheter-Hinckley | F01D 5/3007 416/241 B |
| 2011/0243744 | A1 * | 10/2011 | Forgue | F01D 5/3007 416/204 A |
| 2013/0309073 | A1 * | 11/2013 | Brown | F01D 5/3053 415/173.1 |
| 2014/0003949 | A1 * | 1/2014 | Adam | F01D 11/008 416/193 A |
| 2014/0169979 | A1 * | 6/2014 | Alarcon | F01D 11/008 416/241 R |
| 2014/0199176 | A1 * | 7/2014 | Tomeo | B23P 15/04 416/245 R |
| 2014/0286781 | A1 * | 9/2014 | Billings | F01D 5/3007 416/219 R |
| 2015/0104315 | A1 * | 4/2015 | Tatton | F01D 5/3007 416/174 |
| 2015/0204201 | A1 | 7/2015 | Turner et al. | |
| 2015/0361804 | A1 * | 12/2015 | Hubbert | F01D 5/066 415/202 |
| 2016/0305439 | A1 * | 10/2016 | Alarcon | F01D 11/001 |

* cited by examiner

FAN PLATFORM WEDGE SEAL

BACKGROUND

This application relates to a wedge seal positioned between fan blades and intermediate platforms in a gas turbine engine.

Gas turbine engines are known and typically include a fan delivering air into a bypass duct as propulsion air and also into a compressor. The air is compressed in the compressor and delivered into a combustor where it is mixed with fuel and ignited. Products of this combustion pass downstream over turbine rotors, driving them to rotate.

In modern gas turbine engine design, the efficiency of overall operation becomes paramount. Thus, the leakage of air around any of the operative components is detrimental.

Platforms are positioned intermediate fan blades to guide air across the blades, and limit leakage. In modern gas turbine engines, the intermediate platforms are often molded, such as from a composite. The fans tend to be made from a metallic material. The platforms may have an undesirably high tolerance in manufacturing due to the materials utilized. Also, the platform may be designed prior to the fan. Again, this can result in gaps. As such, seals are placed between edges of the platform and the fan blades.

Generally, V-shaped flexing seals have been utilized.

SUMMARY

In a featured embodiment, a fan rotor includes a fan hub and a plurality of fan blades extending radially outwardly from the fan hub. Platforms are positioned intermediate blade sides of adjacent ones of the fan blades. Seals are positioned between the blade sides and platform sides of the platform seals. The seals have an elongated bonding area bonded to one of the platform sides and the fan blade sides. The seal extends radially outwardly from the elongated bonding area to a wedge portion.

In another embodiment according to the previous embodiment, the elongated bonding area extends into a first undulation, with the first undulation extending circumferentially away from the elongated bonding area to a first bend. A second undulation extends back from the first bend in a direction opposed to the first undulation, and the second undulation extending to the wedge portion. The wedge portion has side edges and a distance between the side edges increases in thickness in a direction moving radially inwardly, such that the wedge portion provides a seal between the blade and platform sides.

In another embodiment according to any of the previous embodiments, the seals are formed of a silicone material.

In another embodiment according to any of the previous embodiments, the platforms are formed of a composite material.

In another embodiment according to any of the previous embodiments, there is at least a third undulation between the second undulation and the wedge portion.

In another embodiment according to any of the previous embodiments, the elongated bonding area is attached to one of the platform sides.

In another embodiment according to any of the previous embodiments, the platform sides extend radially inwardly and with a direction circumferentially toward an opposed one of the platform sides. A bond area is between the platform sides and the elongated bonding area of the seal is along the platform side.

In another embodiment according to any of the previous embodiments, the wedge portion moves radially outwardly during rotation of the fan rotor.

In another embodiment according to any of the previous embodiments, the second undulation extends to a second bend which bends circumferentially in an opposed direction from the second undulation to the wedge portion.

In another embodiment according to any of the previous embodiments, the wedge portion has a hollow to provide increased deformability.

In another embodiment according to any of the previous embodiments, the hollow includes a filler.

In another featured embodiment, a gas turbine engine includes a fan connected for delivering air into a bypass duct and into a compressor section. The compressor section is connected to provide air into a combustor. The combustor is connected to provide products of combustion across a turbine section. The turbine section is operable to drive the compressor section and the fan section, with a turbine rotor in the turbine section driving a fan hub of the fan section. The fan hub has a plurality of fan blades extending radially outwardly from the fan hub. Platforms are positioned intermediate blade sides of adjacent ones of the fan blades. Seals are positioned between the blade sides and platform sides of the platforms. The seals have a relatively elongated bonding area bonded to one of the platform sides and the fan blade sides. The seal extends radially outwardly from the elongated bonding area to a wedge portion.

In another embodiment according to the previous embodiment, the elongated bonding area extends into a first undulation, with the first undulation extending circumferentially away from the elongated bonding area to a first bend. A second undulation extends back from the first bend in a direction opposed to the first undulation, and the second undulation extends to the wedge portion. The wedge portion has side edges. A distance between the side edges increases in thickness in a direction moving radially inwardly, such that the wedge portion provides a seal between the blade and platform sides.

In another embodiment according to any of the previous embodiments, the seals are formed of a silicone material, and the platforms are formed of a composite material.

In another embodiment according to any of the previous embodiments, the fan blades are formed of a metallic material.

In another embodiment according to any of the previous embodiments, the elongated bonding area is attached to one of the platform sides.

In another embodiment according to any of the previous embodiments, the platform sides extend radially inwardly and with a direction circumferentially toward an opposed one of the platform sides. A bond area is between the platform sides and the elongated bonding area of the seal is along the platform side.

In another embodiment according to any of the previous embodiments, the wedge portion has a hollow portion.

In another embodiment according to any of the previous embodiments, the turbine rotor drives a fan hub through a gear reduction.

In another featured embodiment, a seal includes an elongated bonding area extending into a first undulation, with the first undulation extending circumferentially away from the elongated bonding area to a first bend. A second undulation extends back from the first bend in a direction opposed to the first undulation, and the second undulation extends to a second bend which bends circumferentially in an opposed direction from the second undulation and extends a wedge portion. The wedge portion is positioned radially outwardly of the elongated bonding area. The wedge portion has side edges. A distance between the side edges increases in thickness in a direction moving radially inwardly.

These and other features may be best understood from the following drawings and specification.

DETAILED DESCRIPTION

Figure 1:
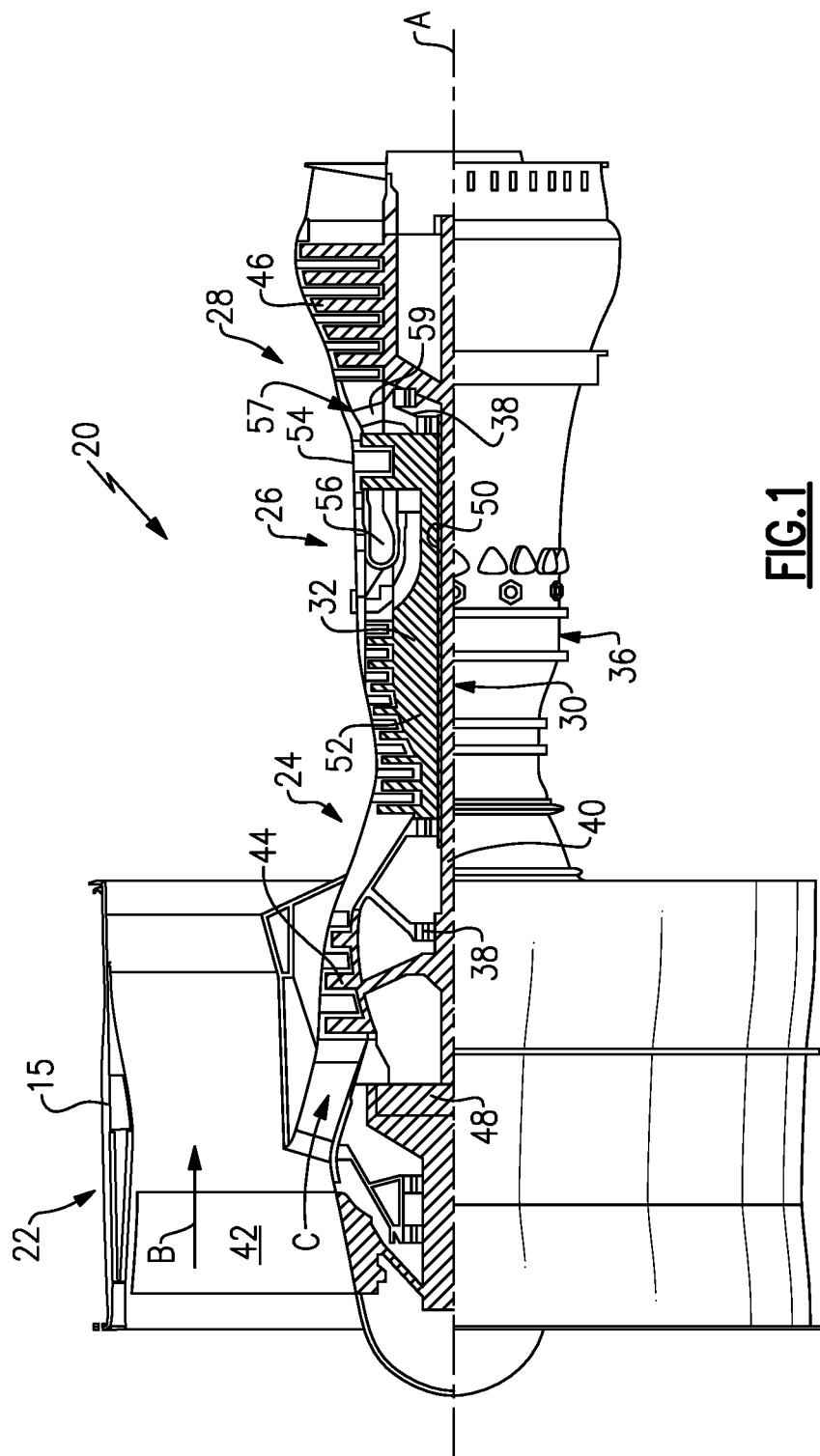
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]_{0.5}$. The "Low corrected fan tip speed" as disclosed herein according to one non-limiting embodiment is less than about 1150 ft/second (350.5 meters/second).

Figure 2:
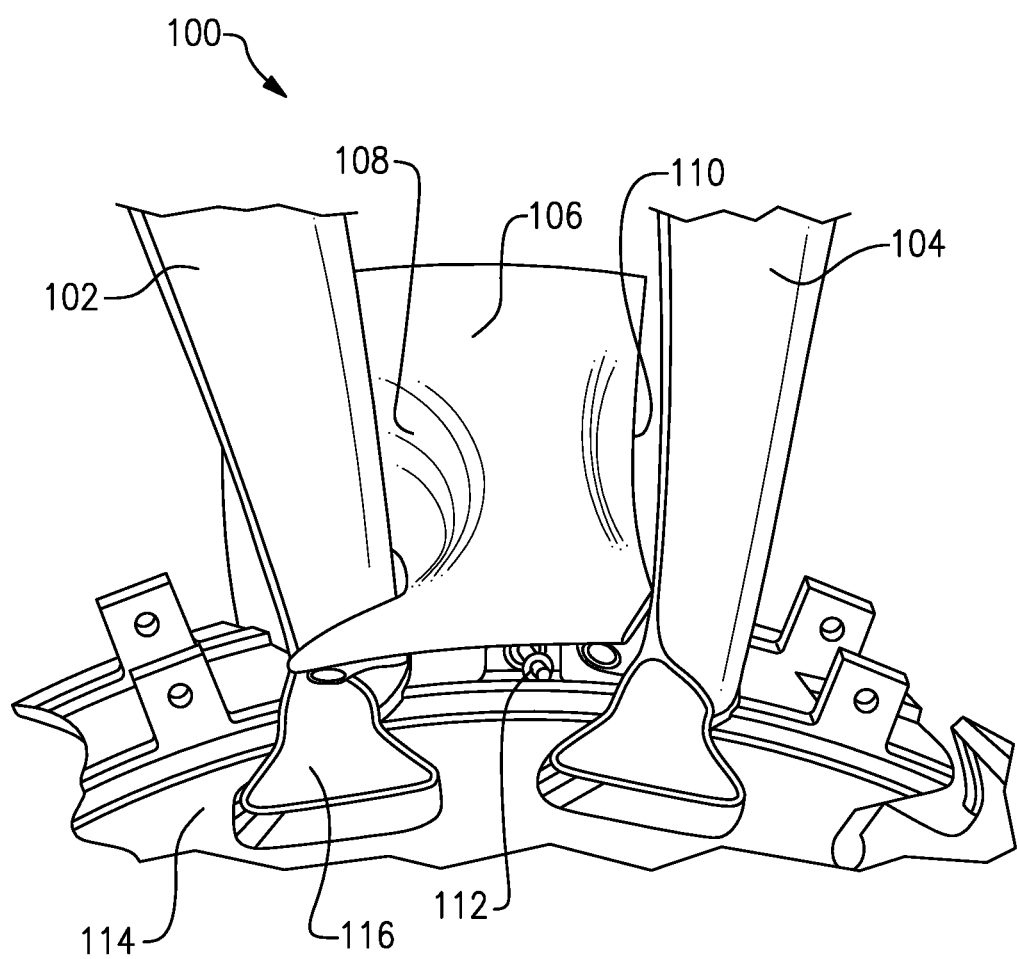
FIG. 2 shows a portion of a fan rotor.

FIG. 2 shows a detail of a fan rotor 100, which may be utilized in an engine such as the engine 20 and, in particular, with an engine utilizing a gear reduction such as gear reduction 48. Two spaced fan blades 102 and 104 are shown, with an intermediate platform 106. As known, the platform 106 may have complex shape such as having curved surfaces 108 and 110 to generally correspond to the outer shapes of the airfoils on the blades 102 and 104. It is known that the platform 106 may be molded from composite materials and, thus, it is difficult to form the platform to as tight of manufacturing tolerances as may be the case for the metallic blades 102 and 104. Also, the platform may be designed earlier in the process from the fan and blades. This can also result in gaps.

The platform 106 is pivotably mounted at 112 to a hub 114 of the fan rotor. There are roots 116 for the fan blades 102 and 104 received in the hub 114. As known, the platform 106 may thus pivot relative to the hub 114 and an interface between the edges 108 and 110 and the blades 102 and 104 can vary somewhat during operation of the engine.

It is known to provide seals at those interfaces and, as mentioned above, the seals have historically been V-shaped. Such seals are subject to undesirable deformation resulting in loss of sealing capability and maintenance activity.

Figure 3:
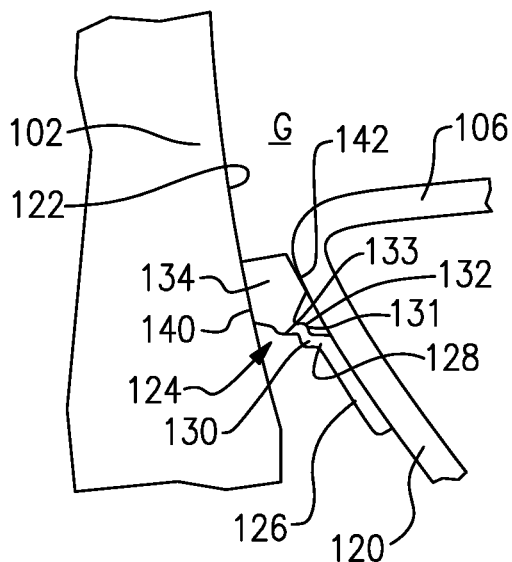
FIG. 3 shows a detail of the FIG. 2 elements.

FIG. 3 shows a seal 124 sealing between an edge 122 of the blade 102 and an angled edge 120 of the platform 106. As can be appreciated, the platform 106 has its edge 120 extending in a direction radially inwardly, but with a circumferential component away from the blade 102. It should be appreciated that the opposed edge of the platform 106 will also extend away from the blade 104. The seal 124 is thus challenged in sealing a gap G between the two surfaces 122 and 120.

The seal 124 has a generally elongated portion 126 which is affixed to the edge 120 of the platform 106. The attachment portion 126 may be affixed by epoxy or other materials.

Notably, the seal 124 may be reinforced with fabric and, in particular, at the bonding area 126, which is affixed to the surface 120. In addition, the entirety of the seal may be provided with a fabric reinforcement to increase erosion and wear-resistance and reduce friction, as appropriate. The fabric reinforcement is used on the bond surface desirably if an epoxy adhesive is to be used. If a silicone adhesive (another common choice) will be used, fabric on the bond surface might not be desired.

The elongated bonding area 126 merges into an undulation 128 extending away from the bonding area to a bend 130, into an undulation 131 extending from bend 130 back to a bend 132. Bend 132 extends to a portion 133 which is then connected to a wedge portion 134. As can be seen, the wedge portion 134 has sides 140/142 tightly received between the surfaces 122 and 120, and will provide a seal across manufacturing tolerances.

Figure 4:
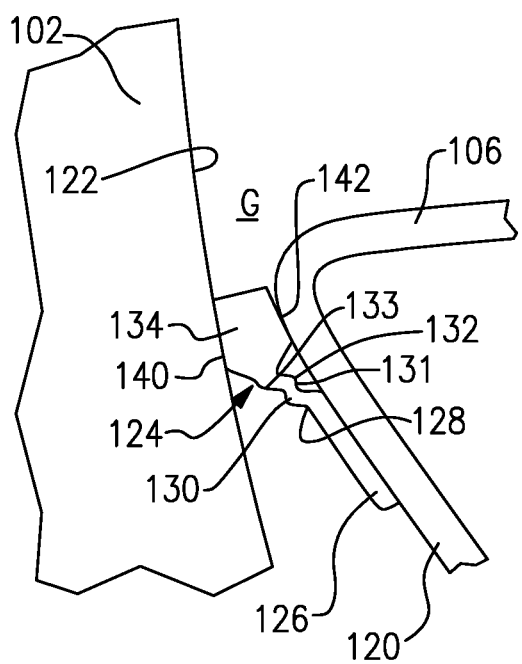
FIG. 4 shows a step in the deployment of a seal subsequent to the FIG. 3 step.

FIG. 4 shows the same seal 124 after being exposed to centrifugal force. The wedge portion 134 is forced radially outwardly to provide a very reliable seal between surfaces 120 and 122.

Figure 5:
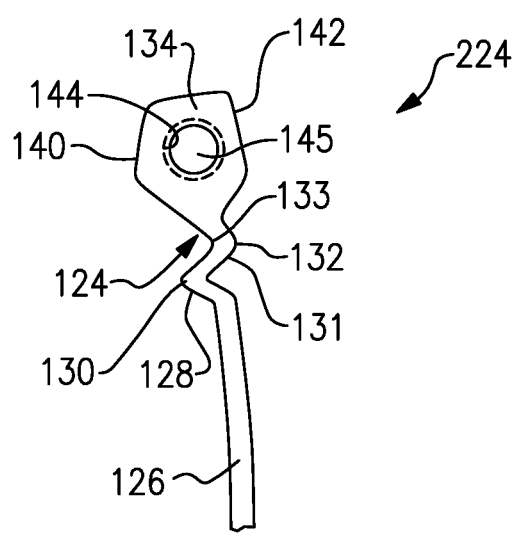
FIG. 5 is a cross-sectional view of a seal embodiment according to this disclosure.

FIG. 5 shows an alternative seal 224 having a hollow ball-shape 144. This will increase the deformability of the wedge portion 134, and ensure even better sealing results. The seal 124 is otherwise similar to seal 224.

FIG. 5 also shows details of the seal 224, which are also true of the seal 124, including angled surfaces 140 and 142. The surfaces 140 and 142 are angled such that they extend in a direction that will be radially inward, and in directions that will be opposed circumferentially relative to each other.

The bulb portion 144 could optionally be filled, as shown at 145, (metallic insert, increased density silicone, etc.) to "tune" the weight such that it creates a stronger seal under centrifugal load (higher mass=larger centrifugal load).

A fan rotor under this disclosure could be said to include a fan hub and a plurality of fan blades extending radially outwardly from the fan hub. Platforms are positioned intermediate blade sides of adjacent ones of the fan blades. Seals are positioned between the blade sides and platform sides of the platform seals. The seals have an elongated bonding area bonded to one of the platform sides and the fan blade sides, and the seals extending radially outwardly from the elongated bonding area to a wedge portion.

A seal comprising according to this disclosure has an elongated bonding area extending into a first undulation. The first undulation extends circumferentially away from the elongated bonding area to a first bend. A second undulation extends back from the first bend in a direction opposed to the first undulation. The second undulation extends to the wedge portion.

Figure 6:
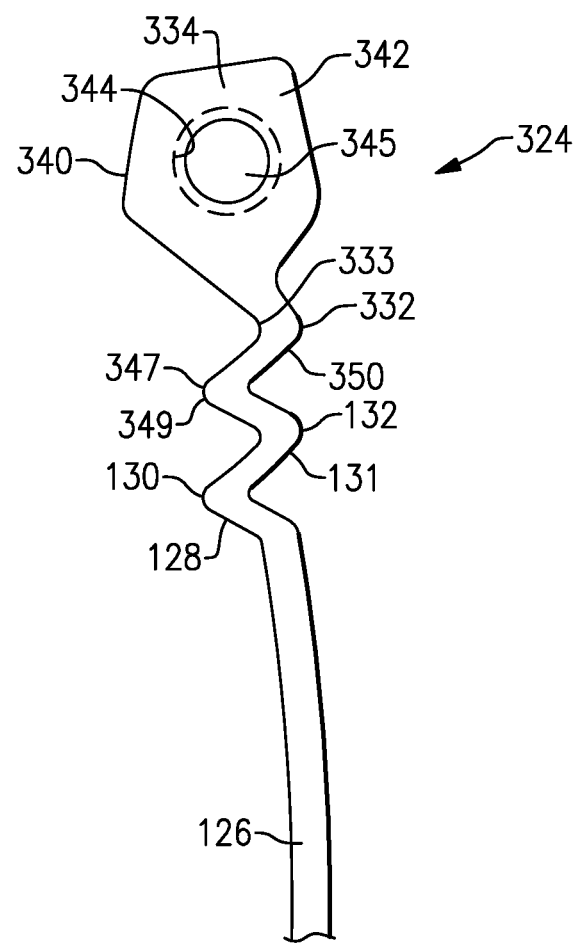
FIG. 6 show another embodiment.

In embodiments, there may be a third undulation, or even more, intermediate the second undulation at the wedge. Still, the second undulation still extends to the wedge, just with intermediate portions. As an example, FIG. 6 shows a third undulation 349 leading into bend 347 and a fourth undulation 350 leading to a bend 332, which then leads to portion 333 and wedge 334. This figure has added 300 to the numbers found in the earlier embodiments for common features.

The wedge portion is positioned radially outwardly of the elongated bonding area when the seal is mounted in an engine. The wedge portion has side edges. A distance between the side edges increases in thickness in a direction moving radially inwardly, such that the wedge portion provides a seal between the blade and platform sides. In details the second undulation extends to a second bend which bends circumferentially in an opposed direction from the second undulation to the wedge portion.

For all of the claimed directions in this application, directions such as "radially" and "circumferentially" should not be taken as directly. Instead they should be interpreted as having a component in the mentioned direction.

Platform 106 may be formed of a composite. Blades 102/104 may be formed of a metal. Seals 221/224 are molded of a silicone.

While the bonding area 126 is second to the platform it can also be second to a blade side.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A fan rotor comprising:
  a fan hub and a plurality of fan blades extending radially outwardly from said fan hub, platforms positioned intermediate blade sides of adjacent ones of said fan blades;
  seals positioned between said blade sides and platform sides of said platforms, said seals having an elongated bonding area bonded to one of said platform sides and said fan blade sides, and said seal having a wedge portion radially outwardly from said elongated bonding area, and there being at least one undulation between said elongated bonding area and said wedge portion; and
  wherein there are a plurality of said at least one undulation, and said elongated bonding area extends into a first said undulation, with said first undulation extending circumferentially away from said elongated bonding area to a first end, and a second said undulation extending back from said first end in a direction opposed to said first undulation, and said second undulation extending to said wedge portion, and said wedge portion having side edges and wherein a distance between said side edges increases in thickness in a direction moving radially inwardly, such that said wedge portion provides a seal between said blade and platform sides.

2. The fan rotor as set forth in claim 1, wherein said seals are formed of a silicone material.

3. The fan rotor as set forth in claim 2, wherein said platforms are formed of a composite material.

4. The fan rotor as set forth in claim 1, wherein there is at least a third undulation between said second undulation and said wedge portion.

5. The fan rotor as set forth in claim 1, wherein said elongated bonding area is attached to one of said platform sides.

6. The fan rotor as set forth in claim 5, wherein said platform sides extend radially inwardly and with a direction circumferentially toward an opposed one of said platform sides, and wherein a bond area between said platform sides and said elongated bonding area of said seal is along said platform side.

7. The fan rotor as set forth in claim 1, wherein said wedge portion moves radially outwardly during rotation of said fan rotor.

8. The fan rotor as set forth in claim 1, wherein said second undulation extends to a second bend which bends circumferentially in an opposed direction from said second undulation to said wedge portion.

9. A fan rotor comprising:
a fan hub and a plurality of fan blades extending radially outwardly from said fan hub, platforms positioned intermediate blade sides of adjacent ones of said fan blades;
seals positioned between said blade sides and platform sides of said platforms, said seals having an elongated bonding area bonded to one of said platform sides and said fan blade sides, and said seal having a wedge portion radially outwardly from said elongated bonding area; and
wherein said wedge portion has a hollow portion to provide increased deformability.

10. The fan rotor as set forth in claim 9, wherein said hollow portion includes a filler.

11. A gas turbine engine comprising:
a fan connected for delivering air into a bypass duct and into a compressor section, said compressor section being connected to provide air into a combustor, said combustor being connected to provide products of combustion across a turbine section, said turbine section being operable to drive said compressor section and said fan section, with a turbine rotor in said turbine section driving a fan hub of said fan section;
said fan hub having a plurality of fan blades extending radially outwardly from said fan hub, platforms positioned intermediate blade sides of adjacent ones of said fan blades;
seals positioned between said blade sides and platform sides of said platforms, said seals having a relatively elongated bonding area bonded to one of said platform sides and said fan blade sides, and said seal having a wedge portion radially outwardly from said elongated bonding area, and there being an undulation between said elongated bonding area and said wedge portion; and
wherein there are a plurality of said at least one undulation, and said elongated bonding area extending into a first said undulation, with said first undulation extending circumferentially away from said elongated bonding area to a first end, and a second said undulation extending back from said first end in a direction opposed to said first undulation, and said second undulation extending to the wedge portion and said wedge portion having side edges and wherein a distance between said side edges increases in thickness in a direction moving radially inwardly, such that said wedge portion provides a seal between said blade and platform sides.

12. The gas turbine engine as set forth in claim 11, wherein said seals are formed of a silicone material, and said platforms are formed of a composite material.

13. The gas turbine engine as set forth in claim 12, wherein said fan blades are formed of a metallic material.

14. The gas turbine engine as set forth in claim 11, wherein said elongated bonding area is attached to one of said platform sides.

15. The gas turbine engine as set forth in claim 14, wherein said platform sides extend radially inwardly and with a direction circumferentially toward an opposed one of said platform sides, and wherein a bond area between said platform sides and said elongated bonding area of said seal is along said platform side.

16. The gas turbine engine as set forth in claim 11, wherein said wedge portion has a hollow portion.

17. The gas turbine engine as set forth in claim 11, wherein said turbine rotor drives a fan hub through a gear reduction.

* * * * *